W. F. WARDEN.
OIL FILTER.
APPLICATION FILED MAY 11, 1914.

1,140,727.

Patented May 25, 1915.

Witnesses
Jas. L. Butler.
A. L. McClintock

Inventor
W. F. Warden.
C. E. Humphrey
By
Attorney

UNITED STATES PATENT OFFICE.

WILLIAM F. WARDEN, OF AKRON, OHIO.

OIL-FILTER.

1,140,727.

Specification of Letters Patent. Patented May 25, 1915.

Application filed May 11, 1914. Serial No. 837,648.

*To all whom it may concern:*

Be it known that I, WILLIAM F. WARDEN, a citizen of the United States, residing at Akron, in the county of Summit and State of Ohio, have invented new and useful Improvements in Oil-Filters, of which the following is a specification.

This invention relates to improvements in oil filters, and the object of the invention is to provide an oil filter so constructed that the filtering media employed may be cleaned at any time without interrupting the flow of oil through the filter or impairing the filtering operation thereof.

Briefly, heretofore it has been necessary in cleaning the oil filters, especially those serving large plants, to arrest the flow of oil through the filtering media to permit the cleaning of the filter, thereby endangering the machinery served by the filter and rendering the function and usefulness of the filter of less value than if the cleansing operation did not interrupt the continuous flow of oil.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to, which come within the scope of the matter hereinafter claimed.

Figure 1:
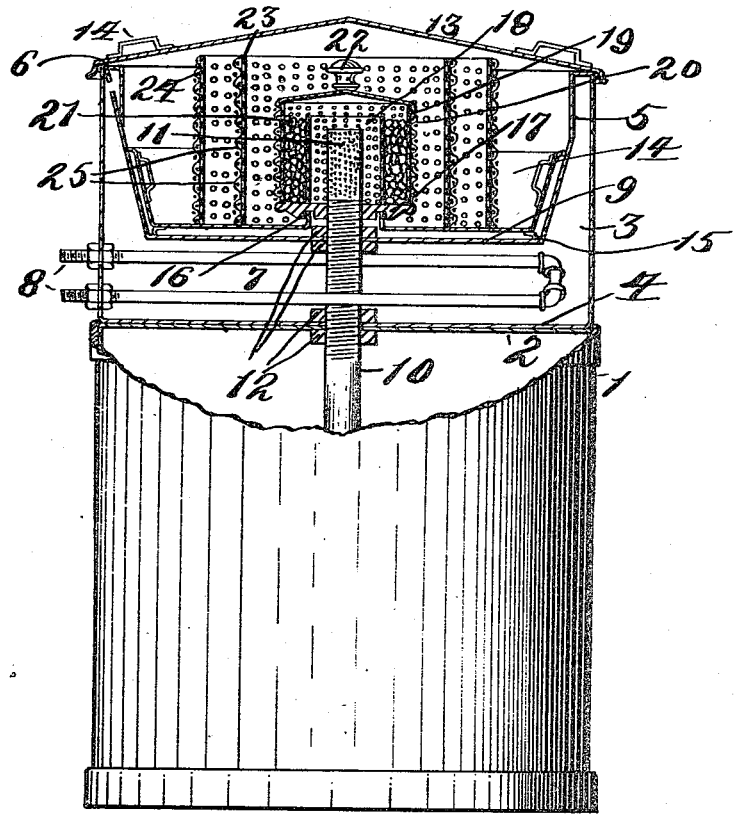
Figure 2:
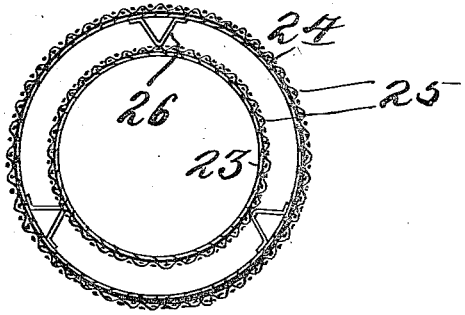

In the drawings in which similar reference numerals indicate like parts in the different figures, Figure 1, is a view partly in vertical central section and partly in side elevation showing a simple form of filter embodying this invention; and, Fig. 2, is a plan view of a portion of the filtering media detached from the filter.

The drawings presented show an unusually simple form of filter to illustrate the invention and the description and drawing details not needed for the full understanding of the invention have been omitted.

In the drawings the reference numeral 1 denotes a tank or receptacle constituting a reservoir for the filtered oil and provided with an upper wall 2 provided with an opening.

Positioned on and supported by the reservoir is an upper tank 3 provided with a lower wall 4 having an aperture registering with the aperture in the upper wall 2 of the reservoir 1.

The upper portion of the upper tank 3 is open and adapted to be positioned therein is a removable receptacle 5 having at the marginal portion of its upper edge a laterally-projecting flange 6 adapted to seat on the upper edge of the wall of the tank 3 for supporting it in spaced relation with respect to the lower wall 4 thereby providing a space 7 in which is a steam coil 8 for heating the receptacle 5.

The lower wall 9 of the receptacle 5 is provided with an aperture in vertical registration with respect to the apertures in the walls 2 and 4 and in these alined apertures is a discharge pipe 10 the upper end 11 of which projects upwardly a considerable distance above the lower wall 9 of the receptacle 5 and which is provided with a plurality of minute perforations.

The joints between the walls 2, 4 and 9 around the pipe 10 are closed through the medium of packing or clamping members 12. The receptacle 5 is provided with a closure member 13 equipped with handles 4 for the easy removal thereof.

Positioned in the lower portion of the receptacle 5 is a sedimentation pan 4 supported in spaced relation with respect to the wall 9 by means of spacing members 15 and the central lower wall of this pan is provided with an aperture approximately concentric with the axis of the pipe 10 and provided with an upturned flange 16.

Adapted to be supported on the upper threaded end of the discharge pipe 10 is a plate 17 of a filtering chamber provided with an annular groove in its lower face adapted to receive the upturned marginal flange 16. The plate 17 constitutes a supporting medium for a cylindrical foraminous wall 18 surrounding the upper end 11 of the pipe 10 and arranged in spaced relation therewith. Surrounding the member 18 is a foraminous cylinder 19 spaced from the cylinder 18 to provide an annular space in which is placed a filtering medium 21 such as animal bone black.

If desired, the outer face of the cylinder 19 may be covered with a layer of fabric 20 but this, however, is not absolutely necessary. The cylinder 19 supports an imperforate closure member 22. Surrounding the cylinder 19 and in spaced relation thereto and with respect to each other, are a pair of foraminous cylinders 23 and 24 seated in the pan 14 and each of which is provided on its outer face with a layer 25 of filtering fabric. The cylinders 23 and 24 preferably are higher than the cylinder 19 and are held in spaced relation with respect to each other through the medium of spacing members 26 secured to either of the cylinders 23 and 24 and engaging the other member and as shown in the drawings they consist of V-shaped ribs secured to the outer cylinder 24 with the apices of the spacing members 26 engaging the fabric 25 on the inner cylinder 23.

In use, the dirty oil is poured into the receiving receptacle 5 from whence it passes through the filtering media 25 on the two cylinders 23 and 25 and from thence through the bone black to the interior of the inner cylinder 18 to the discharge pipe 10 from whence it descends by gravity to the reservoir 1.

In the event of the necessity for cleaning either of the filtering cloths 25 they may be separately removed and cleaned or replaced by fresh layers of fabric and returned to their original positions. It will be seen from this that if the outer cylinder 24 is removed the filtering operation is performed by the cloth 25 on the inner cylinder 23, and should the cloth 25 on the inner cylinder 23 become clogged the inner cylinder may be removed and the filtering operation accomplished through the medium of the cloth 25 on the outer cylinder. It may be stated that it is necessary that at least two cylinders be employed so that in the event of the removing of one the function can be performed by the other, thereby permitting the ready cleaning of one without interrupting the flow of the oil and the filtering operation.

I claim:

1. An oil filter comprising a hollow casing divided horizontally by a partition into upper and lower compartments, the latter constituting a receptacle for filtered oil, a receiving receptacle for dirty oil positioned in the upper compartment, a pipe extending from the lower compartment and terminating in said receptacle, a wide collar detachably secured on said pipe within said receptacle, a pair of tube-like members of foraminous material mounted on said collar and separated from each other to provide an annular space for the reception of comminuted filtering material, a cover for closing the upper open end of the outer member, an annular sleeve-like member of foraminous material supported by said receiving receptacle inclosing, spaced from and independent of said collar and a layer of fibrous material secured to said annular members, all of said members being positioned in the path of oil flowing horizontally in said receiving receptacle and each independently removable.

2. An oil filter comprising a hollow casing divided horizontally by a partition into upper and lower compartments, the latter constituting a receptacle for filtered oil, a receiving receptacle for dirty oil positioned in the upper compartment, a pipe extending from the lower compartment and terminating in said receptacle, a wide collar detachably secured on said pipe within said receptacle, a pair of tube-like members of foraminous material mounted on said collar and separated from each other to provide an annular space for the reception of comminuted filtering material, a cover for closing the upper open end of the outer member, a pair of annular sleeve-like members formed of foraminous material mounted on said receiving receptacle inclosing, spaced from and independent of said collar and its mechanism, means carried by one of said annular members adapted to hold said members in spaced relation, a layer of fibrous material secured to each of said annular members, all of said members being positioned in the path of oil flowing horizontally in said receiving receptacle, and each independently removable.

In testimony whereof I have hereunto set my hand in presence of two subscribing witnesses.

WILLIAM F. WARDEN.

Witnesses:
 A. L. McCLINTOCK,
 C. E. HUMPHREY.